United States Patent
Ogawa et al.

(10) Patent No.: US 7,010,718 B2
(45) Date of Patent: Mar. 7, 2006

(54) METHOD AND SYSTEM FOR SUPPORTING NETWORK SYSTEM TROUBLESHOOTING

(75) Inventors: Yukio Ogawa, Mitaka (JP); Eiji Ohira, Hamura (JP); Kazunori Katayama, Yokohama (JP); Masaki Hirai, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 549 days.

(21) Appl. No.: 10/217,813

(22) Filed: Aug. 14, 2002

(65) Prior Publication Data

US 2003/0093709 A1    May 15, 2003

(30) Foreign Application Priority Data

Nov. 13, 2001  (JP) ............................ P2001-346851

(51) Int. Cl.
*G06F 11/00* (2006.01)
(52) U.S. Cl. .......................... 714/4; 714/26; 709/224
(58) Field of Classification Search .................. 714/4, 714/47, 48; 709/224; 370/242
See application file for complete search history.

(56) References Cited

U.S. PATENT DOCUMENTS

| | | | | |
|---|---|---|---|---|
| 5,568,491 A | * | 10/1996 | Beal et al. .................. | 714/746 |
| 5,640,505 A | * | 6/1997 | Hearn et al. .................... | 714/4 |
| 5,699,403 A | * | 12/1997 | Ronnen .................... | 379/15.04 |
| 5,819,028 A | * | 10/1998 | Manghirmalani et al. ..... | 714/57 |
| 6,269,401 B1 | * | 7/2001 | Fletcher et al. ............. | 709/224 |
| 6,308,174 B1 | * | 10/2001 | Hayball et al. ............... | 707/10 |
| 6,405,250 B1 | * | 6/2002 | Lin et al. ..................... | 709/224 |
| 6,557,035 B1 | * | 4/2003 | McKnight ................... | 709/224 |
| 6,738,811 B1 | * | 5/2004 | Liang ......................... | 709/224 |
| 6,862,698 B1 | * | 3/2005 | Shyu ........................... | 714/57 |
| 6,883,120 B1 | * | 4/2005 | Banga ......................... | 714/47 |

FOREIGN PATENT DOCUMENTS

| | | |
|---|---|---|
| JP | 11-027285 | 7/1997 |
| JP | 11-163862 | 9/1998 |
| JP | 2002-99469 | 9/2000 |

* cited by examiner

*Primary Examiner*—Robert Beausoliel
*Assistant Examiner*—Yolanda L Wilson
(74) *Attorney, Agent, or Firm*—Reed Smith LLP; Stanley P. Fisher, Esq.; Juan Carlos A. Marquerz, Esq.

(57) ABSTRACT

The system for supporting network troubleshooting of the invention includes: storage means for periodically storing setting/configuration data and performance data of devices constituting the network based upon a schema of device IDs, interface IDs, and a respective CONFIG version number; monitoring means for monitoring the performance data of the devices by comparing the performance data with respective threshold values; identifying means for identifying the faulty device based upon the schema, when the performance data of at least one device goes beyond a respective threshold value ("faulty device"), wherein the storage means further stores the identified result for network troubleshooting. Thus, the system can estimate a factor of a change of operating condition of the network system and repair accordingly.

20 Claims, 12 Drawing Sheets

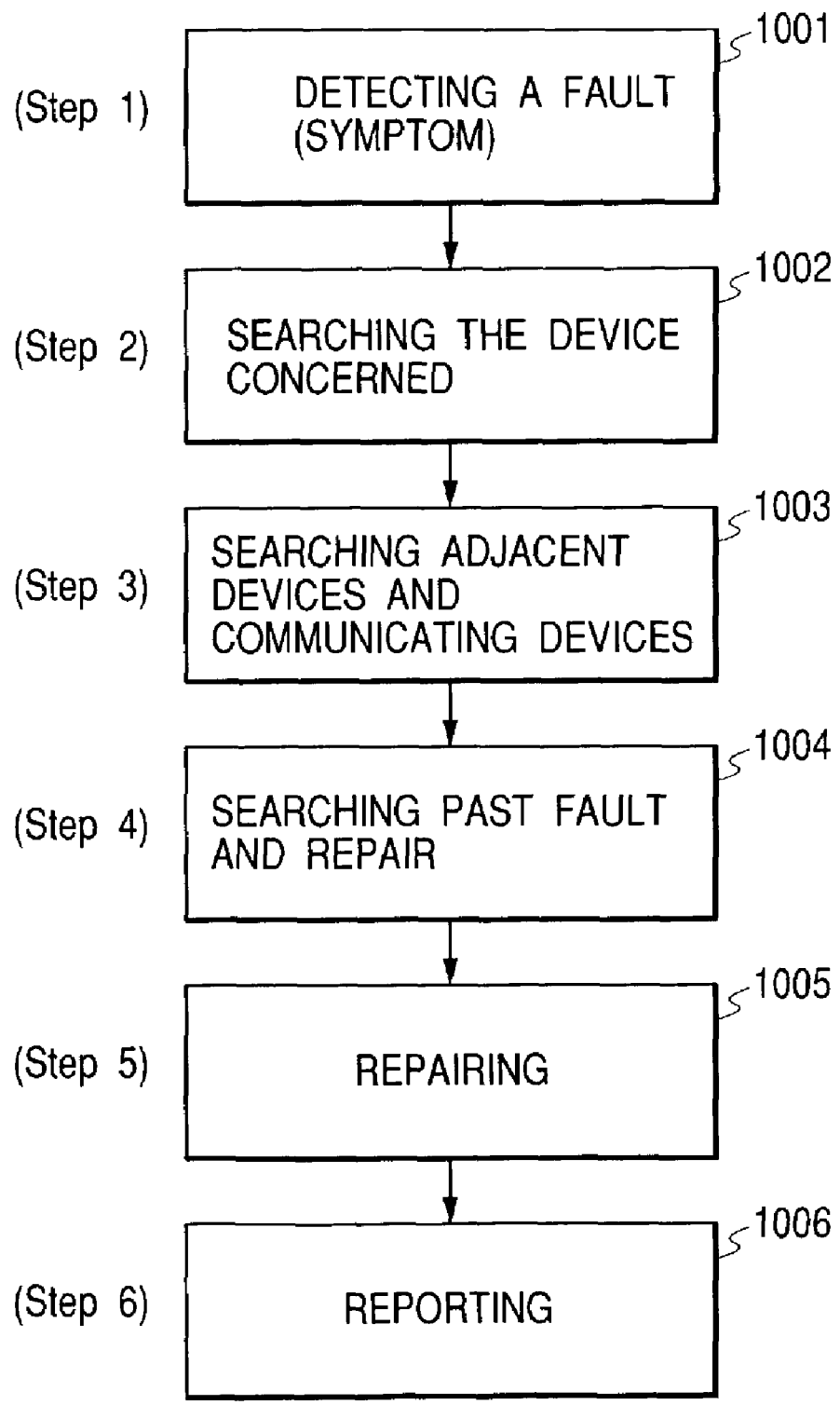

FIG. 11
PRIOR ART

```
                              ┌─1101
┌─────────────────────────────────────────────────────────────┐
│          BUILDING WORK FILE (WORK DIRECTIONS)               │
├─────────────────────────────────────────────────────────────┤
```

1102 — DATE          3/4
1103 — LOCATION      RELAY STATION-A
1104 — OPERATIONS
  • ADDING A NEW HUB (HUB_A-Relay_5)
  • SETTING UP (CONFIGURING) A NEW PVC ON ROUTER
    (Router_A-Relay_1), WHICH IS CONNECTED TO B-BRANCH
  • CHANGING THE CONFIGURATION OF PVC ON ATM-SW
    (ATM-SW_A-Relay_1), WHICH IS CONNECTED TO B-BRANCH

FIG. 12
PRIOR ART

PERIOD 2000/3/1-2000/3/31

RELAY STATION-A

BUILDING WORK HISTORY
  3/4
   • ADDING A NEW HUB (HUB_A-Relay_5)
   • SETTING UP (CONFIGURING) A NEW PVC ON ROUTER
     (Router_A-Relay_1), WHICH IS CONNECTED TO B-BRANCH
   • CHANGING THE CONFIGURATION OF PVC ON ATM-SW
     (ATM-SW_A-Relay_1), WHICH IS CONNECTED TO B-BRANCH
  3/6
   • INSTALLING OF A MONITORING SERVER (Manager_A-Relay_1)
  3/11
   • MOVING RACK
   • SETTING A CONFIGURATION OF E-BRANCH ON THE
     MONITORING SERVER (Manager_A-Relay_1)

METHOD AND SYSTEM FOR SUPPORTING NETWORK SYSTEM TROUBLESHOOTING

FIELD OF THE INVENTION

The present invention relates to a method or system for the operation management of a network system, and more particularly to a system for managing performance data of network devices in a database, diagnosing a state of operation of a network system, analyzing a fault factor, and repairing according to a multi-layer performance data correlation schema.

BACKGROUND OF THE INVENTION

In JP-A-163862/1999 entitled "Network Traffic Monitoring Method" describes a system for monitoring a utilization factor of a network system.

In JP-A-27285/1999 entitled "Network Management System and Recording Medium" discloses a technique related to a system for linking configuration management and operation management in a network system with each other.

According to the technique disclosed in the above JP-A-163862/1999 publication, utilization factors of plural network segments are measured and displayed graphically. In the above JP-A-27285/1999 publication, reference is made to a method of retrieving data correlated between configuration management information and operation management information of devices thereby preparing a correlation of the two.

However, no reference is made therein to a method of managing the history of setting information and configuration data of devices and hence no reference is made therein to a method of displaying setting information and configuration data of the devices or the relevant fault information simultaneously with performance data of the devices. Therefore, even if it is possible to recognize changes in the state of operation of network devices, it is necessary, for figuring out or estimating a factor thereof, to check the history of setting information and configuration data of the devices, as well as fault information. Thus, time and a personal resource are needed for figuring out or estimating a factor in a varying state of operation of a network system.

Accordingly, it is a first object of the present invention to provide a network troubleshooting support system which figures out or estimates a factor in a varying state of operation of a network system. It is a second object of the present invention to provide a network troubleshooting support system which repairs in a varying state of operation of a network system.

SUMMARY OF THE INVENTION

For achieving the above first object, the system for supporting network troubleshooting of the invention includes: storage means for periodically storing setting/configuration data and performance data of the devices constituting the network based upon a schema of device IDs, interface IDs, and a respective CONFIG version (i.e., configuration information recorded at one specific time point) number; monitoring means for monitoring the performance data of the devices by comparing the performance data with respective threshold values; identifying means for identifying the faulty device based upon the schema, when the performance data of at least one device goes beyond a respective threshold value ("faulty device"), wherein the storage means further stores the identified result for network troubleshooting.

"Simultaneously" refers to herein means displaying information pieces on a screen at a time for one example or displaying information pieces at a time on separate display units. Or, using the same screen, data displays may be switched among each other. Anyhow, various modes are conceivable to allow the operator to recognize the displayed information as the correlated information.

"Building work" means the works or operations that the workers do when they construct the network, such as setting up the device, setting up the interface and configuring the devices, for example.

Further, for achieving the above first object, there is provided means which registers in a database such fault event information as network system plan stop record, device fault information, and system log (SYSLOG) and which displays fault event information of the concerned device and adjacent devices or communicating devices located along a communication path simultaneously with performance data.

For achieving the above second object, there is provided means which registers the contents for repairing a fault in a network system and which displays the contents of a fault repair corresponding to the fault event information of the concerned device and adjacent devices or communicating devices located along a communication path which are displayed simultaneously with performance data of one device or plural devices.

In one aspect of the present invention there is provided a data managing method in a network system. According to one aspect of the method, the supporting method for network troubleshooting includes the steps of: storing setting/configuration data and performance data of the devices constituting the network based upon a schema of device IDs, interface IDs, and a respective CONFIG version number; monitoring the performance data of the devices by comparing the performance data with respective threshold values; when the performance data of at least one device goes beyond a respective threshold value ("faulty device") identifying the faulty device based upon the schema; and storing the identified result for network troubleshooting. According to another aspect of the method, the operation data managing method for a network system includes the steps of: establishing a data management schema of the network system based upon components of the network, relation between the components, and operation data associated with the components; periodically storing the operation information based upon the schema and a respective CONFIG version number; and selectively extracting at least one of the components and associated operation data using the CONFIG version as a linking key, wherein the operation data include setting/configuration data and performance data of the components.

The present invention comprises the above configurations, so by managing the history of setting information and configuration data on network devices and by displaying the setting information and the configuration data of the concerned device and adjacent devices or communicating devices in association with performance data of network devices, it is possible to figure out and estimate a factor of a change of operating condition in a network system.

Besides, by managing the history of building work information of network devices and by displaying building work information of the concerned device and adjacent devices or communicating devices simultaneously with performance data of network devices, it is possible to figure out and estimate a factor of a change of operating condition in a network system.

Moreover, by managing the history of fault event information of network devices and by displaying fault event information of the concerned device and adjacent devices or communicating devices simultaneously with performance data of network devices, it is possible to figure out and estimate a factor of a change of operating condition in a network system.

Further, by managing a recovery work record in accordance with the history of fault event information of network devices and by displaying the contents of a fault repair corresponding to fault event information of the concerned device and adjacent devices or communicating devices displayed simultaneously with performance data of network devices, it is possible to repair/recover a change of operating condition in a network system.

BRIEF DESCRIPTION OF THE DRAWINGS

The foregoing and additional features and characteristics of the present invention will become more apparent from the following detailed description considered with reference to the accompanying drawings in which like reference numerals designate like elements and wherein:

FIG. 10 is a flow chart of a fault repairing process according to the present invention;

FIG. 11 shows an example of a conventional building work file (work directions) related to the present invention;

FIG. 12 shows an example of extracting a building work history from the building work file in FIG. 11;

DETAILED DESCRIPTION OF THE PREFERRED EMBODIMENTS

Embodiments of the present invention will be described herein under with reference to the accompanying drawings.

Figure 1:
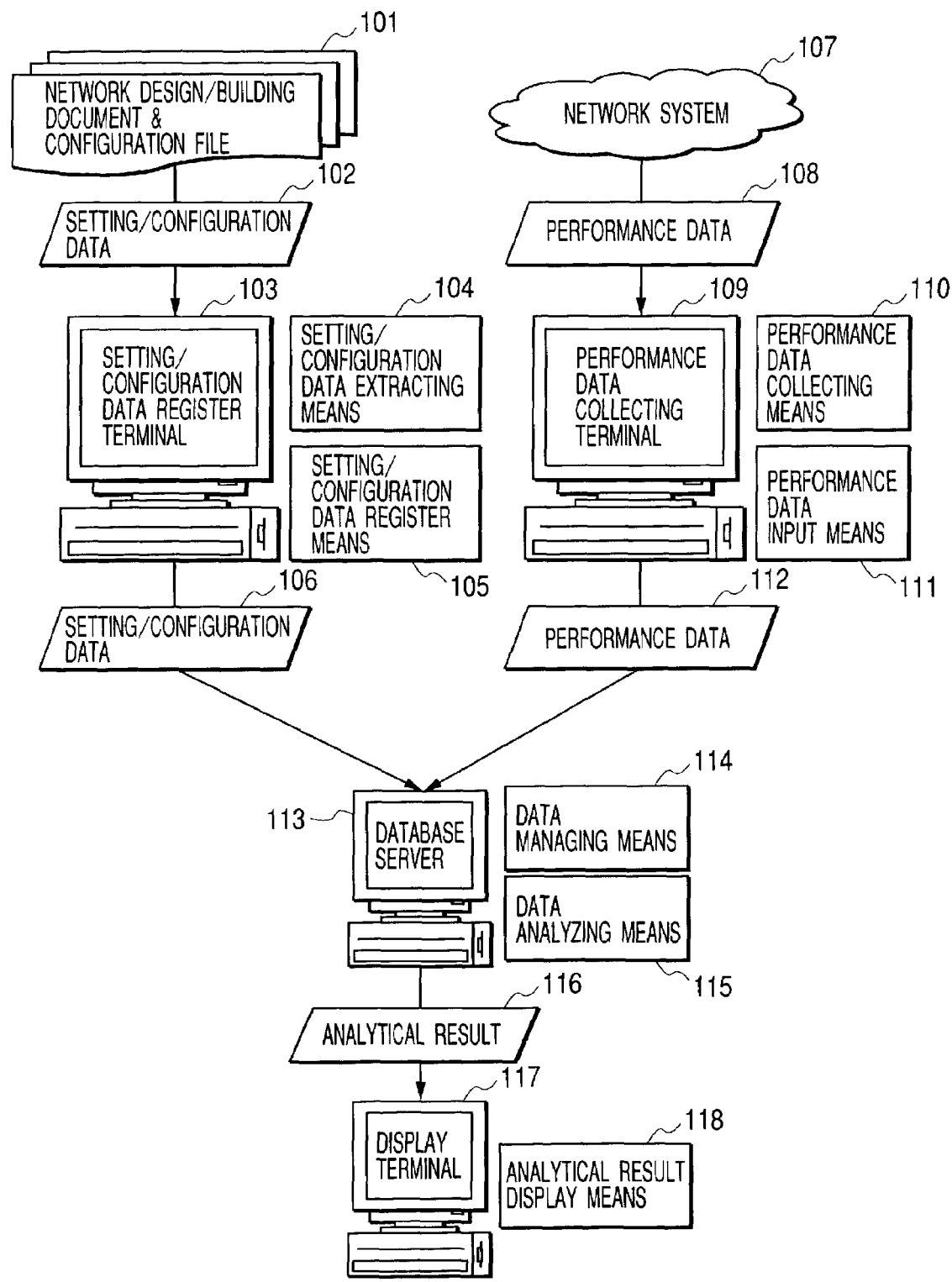
FIG. 1 is a system block diagram according to the present invention.

FIG. 1 shows a functional configuration example of a network troubleshooting support system according to the present invention. With reference to FIG. 1, a description is given below about a hardware configuration and a functional configuration of a network troubleshooting support system.

A setting/configuration data register terminal 103 is provided with a setting/configuration data extracting means 104 and a design/configuration data register means 105. The setting/configuration data register terminal 103 receives network setting/configuration data 102 extracted from network design/building data and from network device CONFIG (setting file, configuration file) 101 and outputs setting/configuration data 106 to a database server 113.

A performance data collecting terminal 109 is provided with a performance data collecting means 110 and a performance data input means 111. The performance data collecting terminal 109 receives performance data 108 of network devices from a network system 107 and outputs performance data 112 to a database server 113.

The database server 113 is provided with a data managing means 114 and a data analyzing means 115. The database server 113 receives the setting/configuration data 106 from the setting/configuration data register terminal 103 and the performance data 112 from the performance data collecting terminal 109 to output an analytical result to a display terminal 117.

The display terminal 117 is provided with a data display means 118. The analytical result 116 is inputted to the display terminal 117 from the database server 113.

The setting/configuration data extracting means 104 extracts an information item to be inputted to the data managing means 114 from the network system design/build data and the CONFIG 101 of network devices, such as routers, ATM switches, layer 3 switches, and switching hubs, and converts it into a form suitable for input.

The setting/configuration data register means 105 inputs the network system setting/configuration data 102 (extracted by the setting/configuration data extracting means 104) to the data managing means 114 (disposed within the database server 113).

The performance data collecting means 110 collects and stores performance data 108, such as MIB (Management Information Base) information of the devices and MIB information of probes installed in the network from the network devices on the network system 107 at the time of operation of the network system.

The performance data input means 111 inputs the performance data 108 of the network system collected and stored by the performance data collecting means 110 to the data managing means 114 within the database server 113.

The data managing means 114 manages and stores in the database the setting/configuration data 106 of the network system inputted from the setting/configuration data register means 105 and the performance data 112 inputted by the performance data input means 111. The data management items and the structure of database in the data managing means 114 are described later.

The data analyzing means 115 causes the setting/configuration data 106 and the performance data 112 in the data managing means 114 to link with each other, and it analyzes the factor of a network fault.

The data display means 118 displays the analytical result 116 obtained by the data analyzing means 115 with a graphic user interface. The details of the data analyzing means 115 and the data display means 118 are described later in connection with a network fault repairing process. These means can be implemented via hardware and/or software.

Next, the information management items and the structure (table schema) of database in the data managing means 118 are described with reference to FIGS. 3 to 8 in conjunction with FIG. 2.

Figure 2:
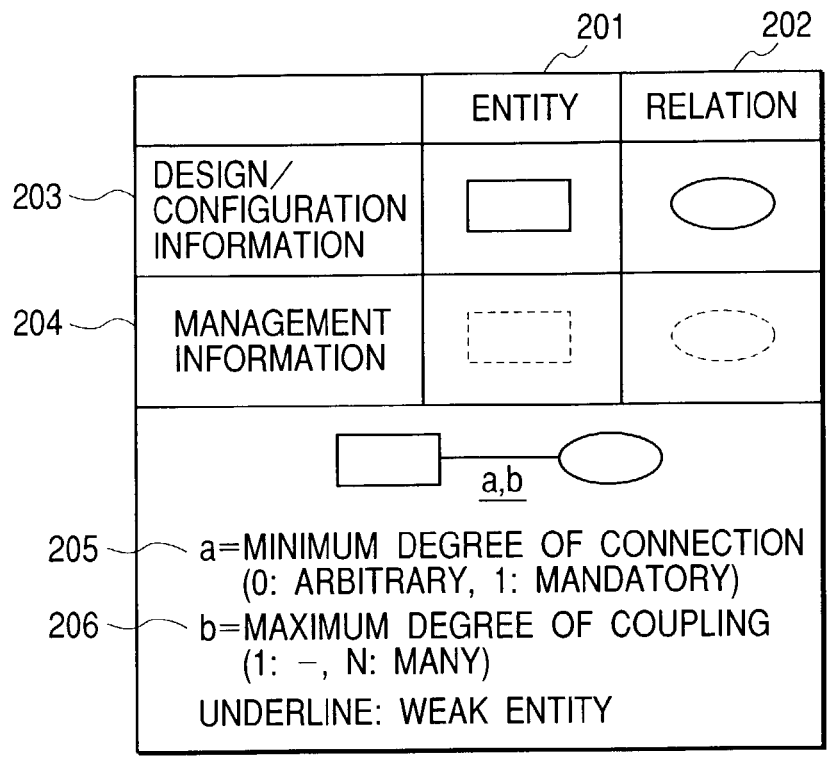
FIG. 2 illustrates a format of a database schema-related diagram according to the present invention.

FIG. 2 shows a table of an entity-related diagram which represents the structure of database. In FIGS. 3 to 8, an entity 201 and relation 202 are represented by a square and a circle, respectively. The entity and the relation concerned with configuration data 203 are represented with a solid line, while the entity and the relation related to management information 204 are represented with a dotted line. In the following description, entity and relation are represented by [ ] and ( ), respectively.

In a link with another entity, a minimum degree of connection, a, 205, is "0" in an arbitrary connection and "1" in a mandatory connection. A maximum degree of coupling, b, 206 is "1" when connecting to one data at most, and "N" when connecting to many data. In the case of a weak entity depending on another entity, the degree of connection is underlined.

When putting an entity-related diagram into a table, the entity is converted to a table. Relation is converted to a table, or an entity which is linked is incorporated in the attribute of the converted table.

Figure 3:
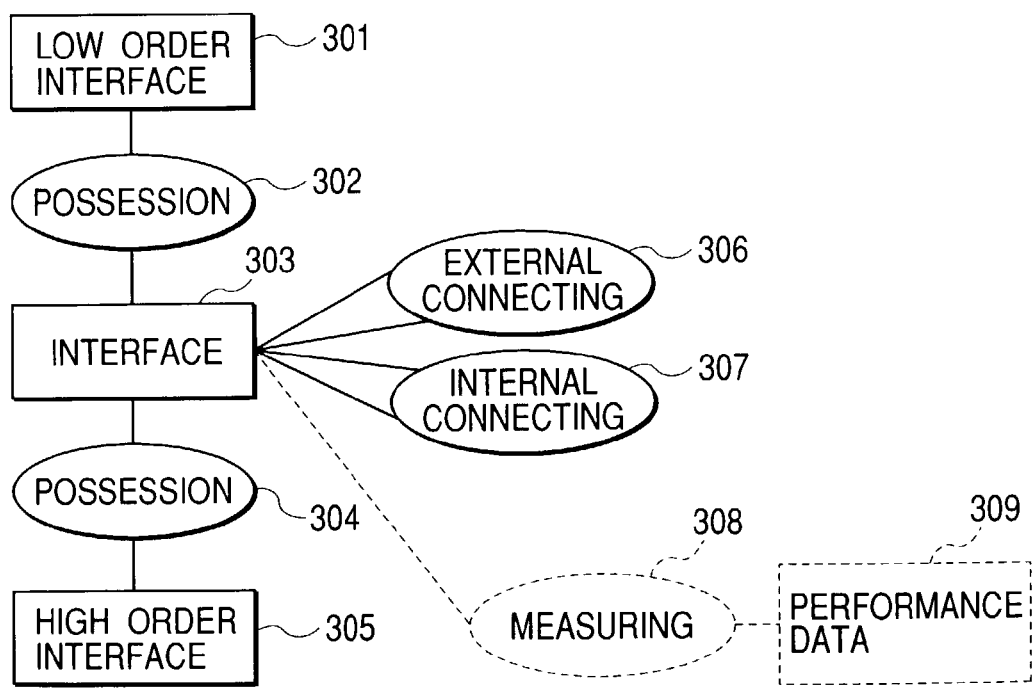
FIG. 3 is a basic model entity-related diagram in network system information according to the present invention.

FIG. 3 is a basic information management model (a schema conception diagram) of a network system. The basic model, which is a basic unit constituting all the models in FIGS. 4 and 7 (described later), comprises a network interface and a connecting relation thereof and adapts the following configuration.

an [Interface] 303 (i.e., a logical interface) is a physical port of a network device or a low order logic port (i.e., a sub-logical interface).

the [Interface] 303 is (possessed) 302 by a [high order interface] 301 (i.e., a physical interface) and (possesses) 304 a [low order interface] 305.

the [Interface] 303 (externally connects) 306 with another [interface] 303 which belongs to another device.

the [Interface] 303 (internally connects) 307 with [interface] 303 which belongs to the same device.

the [Interface] 303 is (measured) 308 for [performance data] 309, such as a transmitted/received traffic volume.

Figure 4:
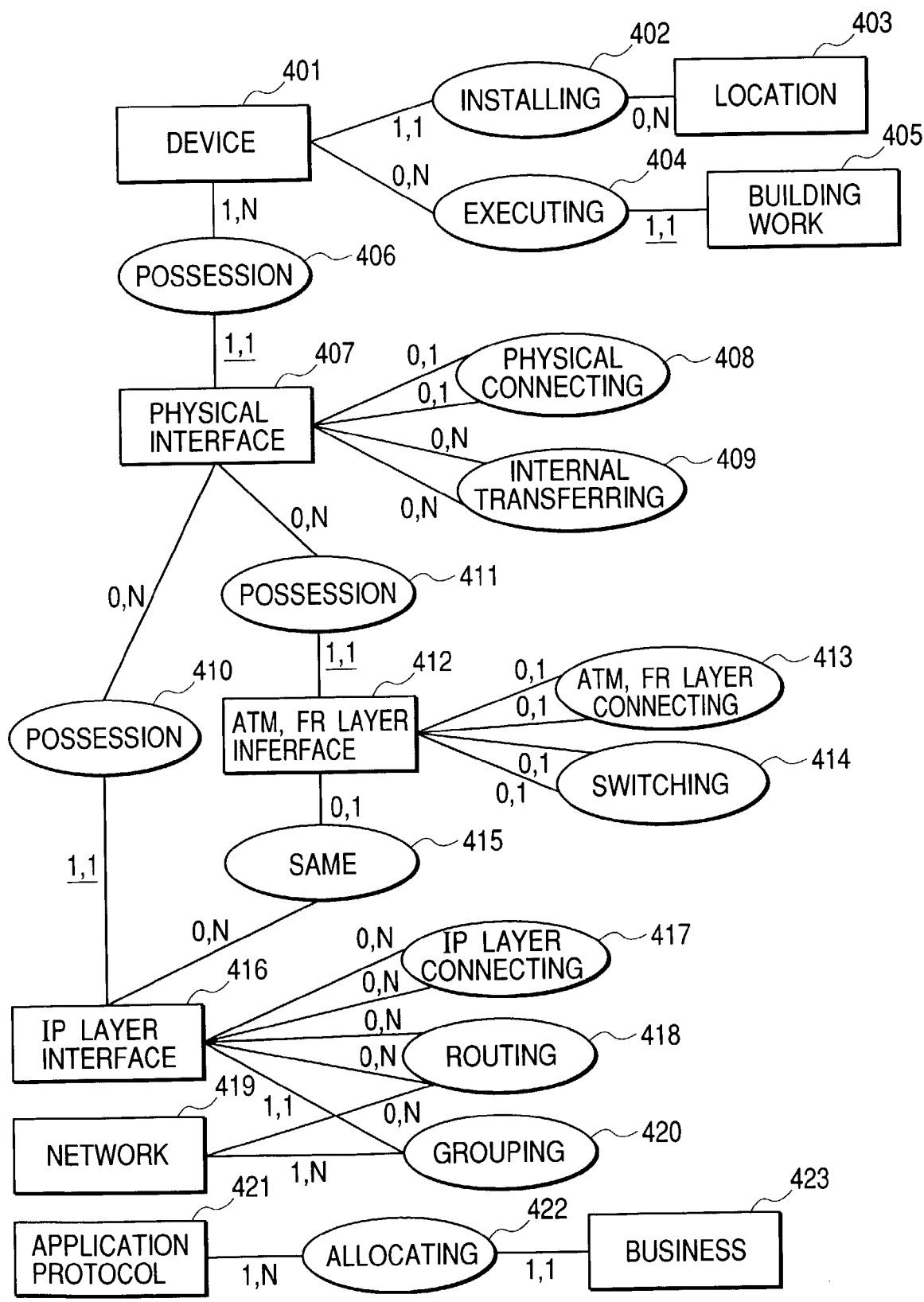
FIG. 4 shows the details of the information management model entity-related diagram of a network system setting/configuration data section according to the present invention in FIG. 3.

FIG. 4 shows the details of the information management model concerned with the setting/configuration data of a network system in FIG. 3. The entire model comprises linkage among the basic models shown in FIG. 3 which includes a [device] 401 —(possession) 406—a [physical interface] 407—(possession) 410—an [IP layer interface] 416 and the [device] 401—(possession) 406—the [physical interface] 407—(possession) 411—an [ATM, FR layer interface] 412. With entities in the linkage as centers, entities and relation corresponding to the concept of "-(external connecting)"; "-(internal connecting)"; "-(measuring)", "[performance data]" are shown in FIG. 3.

The setting/configuration data concerned with [device] 401 adapts the following configuration.

a [Device] 401 indicates any one devices constituting a network system, such as servers, clients, routers, ATM-SWs, LAN-SWs, and HUBs, (possessing) 406 one to N number of [physical interface]s 407.

the [Device] 401 is (installed) 402 in one [location] 403, such as a center, an office, or a relay point. In the [location] 403 are (installed) 402 0 to N number of the [device]s 401.

In the [device] 401, 0 to N number of [building work] 405 are (executed) 404. Each [building work] 405 is (executed) 404 in one [device] 401.

The setting/configuration data on the [physical interface] 407 adapts the following configuration.

the [Physical interface] 407 is a physical port of a network device and is (possessed) 406 by one [device] 401.

the [Physical interface] 407 (possesses) 410 0 to N number of [IP layer interface]s 416.

the [Physical interface] 407 (possesses) 411 0 to N number of [ATM, FR layer interface]s 412. ATM is the abbreviation for Asynchronous Transfer Mode. FR is the abbreviation for Frame Relay.

the [Physical interface] 407 (externally connects) 408 through a physical line with 0 or one [physical interface] 407 which another [device] 401 (possesses) 407.

the [Physical interface] 407 makes an (internal transfer) 409 inside the device for 0 to N number of [physical interface]s 409 which the same [device] 401 (possesses) 406.

The setting/configuration data concerned with the [ATM, FR layer interface] 412 adapts the following configuration.

the [ATM, FR layer interface] 412 is a logical interface between an ATM and an FR in a network device and is (possessed) 411 by one [physical interface] 407. This interface also includes an interface for DDR (Dial on Demand Routing).

the [ATM, FR layer interface] 412 is an interface (identical) 415 with 0 or one [IP layer interface] 416.

the [ATM, FR layer interface] 412 (ATM, FR layer connects) 413 through a logical line, such as PVC or SVC, with 0 or one [ATM, FR layer interface] 412 which another [physical interface] 407 (possesses) 411.

the [ATM, FR layer interface] 412 is (switched) 414 insides the device with respect to 0 to N number of [ATM, FR layer interface]s 412 which belongs to the same [device] 401.

The setting/configuration data concerned with the [IP layer interface] 416 adapts the following configuration.

the [IP layer interface] 416 is a logical interface of an IP layer in a network device and is (possessed) 410 by one [physical interface] 407.

the [IP layer interface] 416 is an interface (identical) 415 with 0 to N number of [ATM, FR layer interface]s 412.

the [IP layer interface] 416 (IP layer connects) 417 logically in an IP layer with 0 to N number of [IP layer interface]s 416 which another [physical interface] 407 (possesses) 410.

the [IP layer interface] 416 is (routed) 418 insides the device toward 0 to N number of [network]s 419 and to 0 to N number of [IP layer interface]s 416 which belong to the same [device] 401.

the [IP layer interface] 410 is (grouped) 420 into one [network] 419. The [Network] 419 (groups) 420 0 to N number of [IP layer interface]s 416.

Further, the following configuration is added in connection with the network setting/configuration data.

[Application protocol] 421 is an application layer protocol, such as FTP, HTTP, or SMTP, and is (allocated) 422 to 1 to N number of [business]es 423 of a network system. Each [Business] 423 is executed with one [application protocol] 421 (allocated) 422 thereto.

Figure 5:
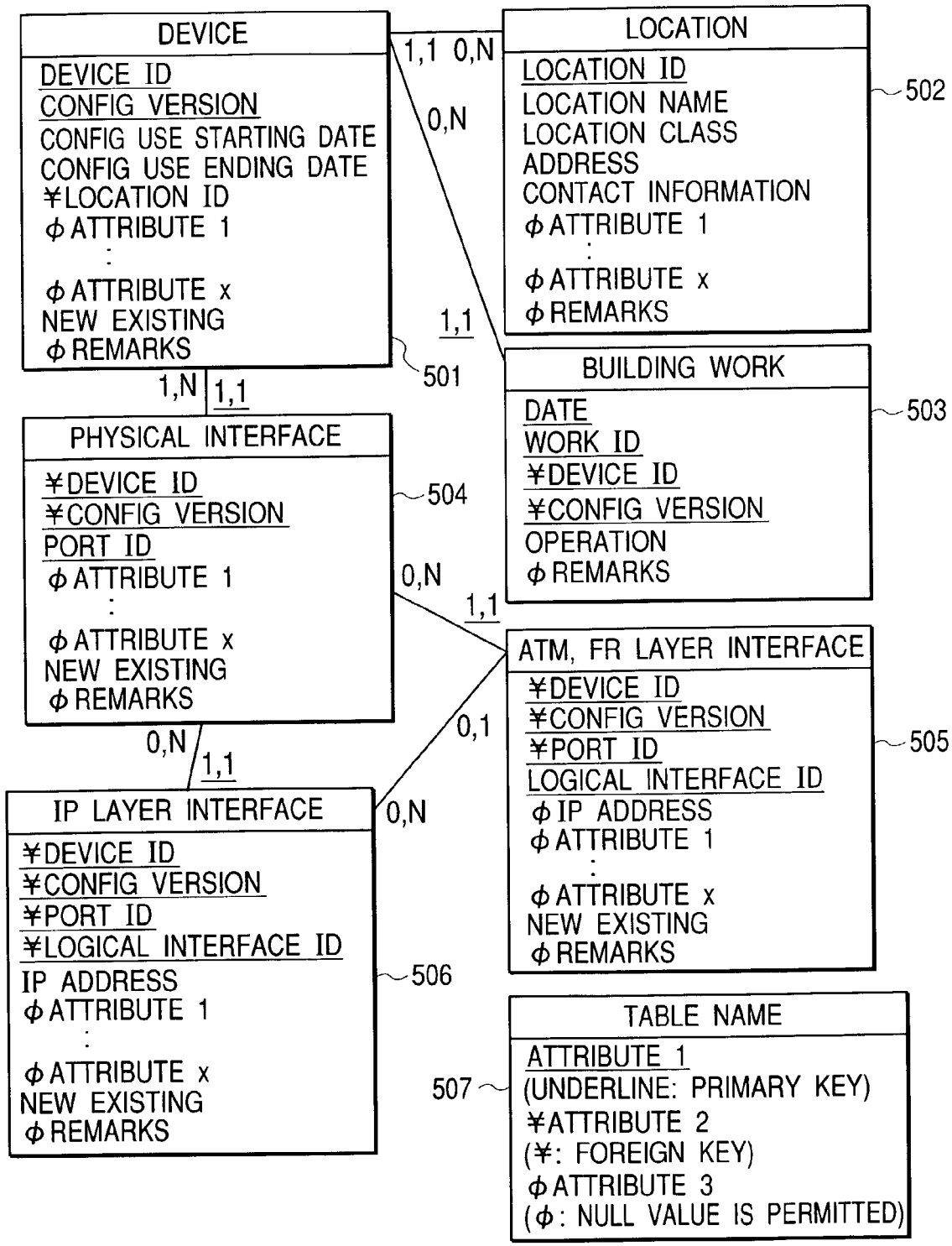
FIG. 5 shows database mounting tables of a network device interface-related section according to the present invention.
Figure 6:
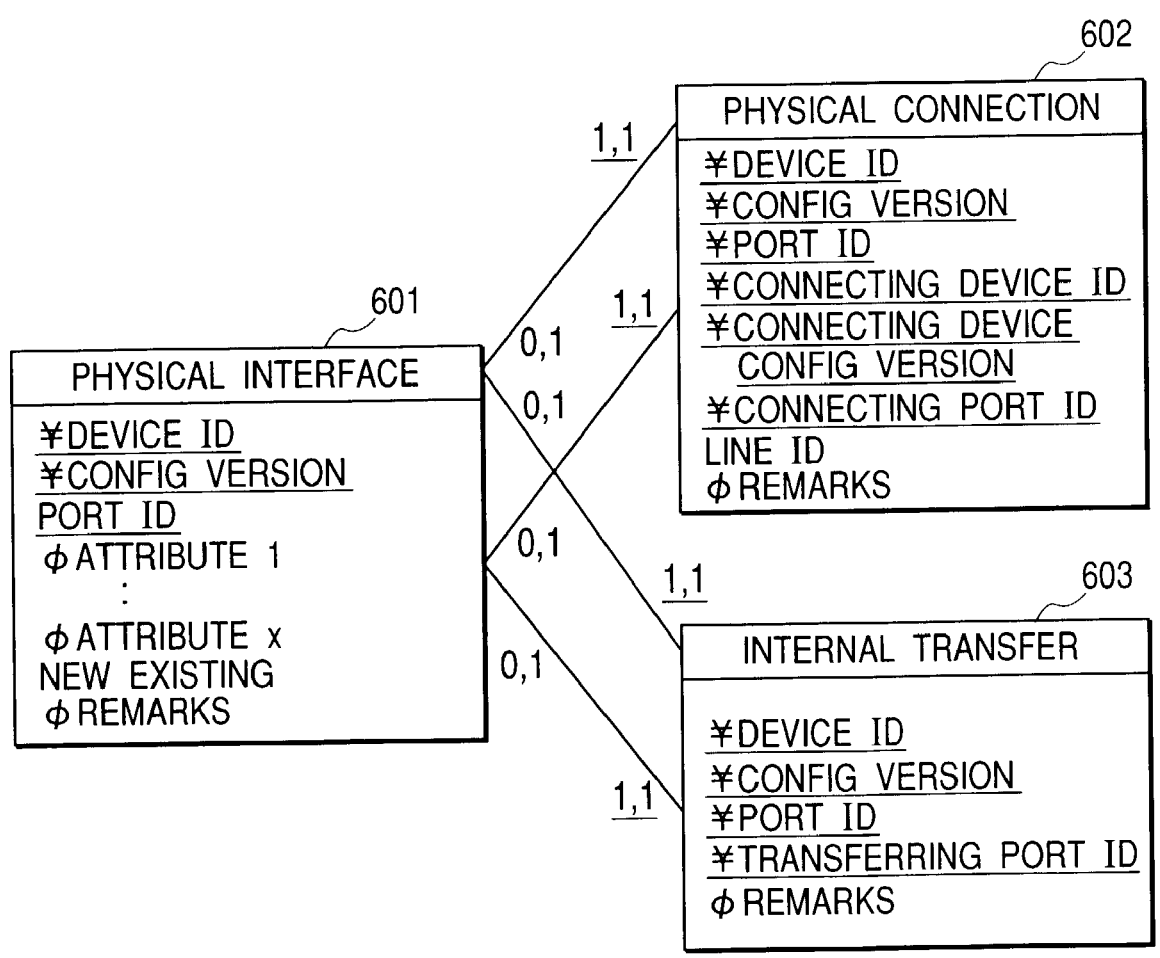
FIG. 6 shows database mounting tables of a physical interface-related section according to the present invention.

FIGS. 5 and 6 are diagrams of a part of the entire model concerned with the setting/configuration data shown in FIG. 4. As shown in explanatory notes 507 in FIG. 5, an attribute as a primary key in each table is underlined, and an attribute as a foreign key for reference to another table is prefixed by "Ұ". Further, an attribute which can take Null value is prefixed by "ɸ".

When tabulating an information management model of the network devices and interfaces shown in FIG. 4, information of time (history) is added. The history management of the network setting/configuration data is performed in a one-dimensional manner by utilizing device CONFIG (setting file) version data. "CONFIG" indicates a file describing interface information and information on the configuration and setting of its IP address and filter. If the configuration or setting of a network is changed, the CONFIG of the concerned device is updated. Therefore, by managing the device setting/configuration data in correlation with the CONFIG version, it becomes possible to manage the history of the network setting/configuration data.

In registering data to each table, data are extracted from CONFIG after network change from the concerned device to another device when there is made a change of network setting and configuration, which are registered in a table together with the CONFIG version, and the date on which the use of CONFIG is started. On an use ending date of the CONFIG now on use is registered as an infinite date. As to data which had been in use until registration of new CONFIG data, the use ending date of CONFIG is updated from the infinite date to the actual use ending date.

A partial change of the CONFIG description contents is possible. A "New/Existing" attribute is set in each table for registering whether the registered data is existing information set in a prior CONFIG or is newly set.

As shown in FIGS. 5 and 6, the other tables than "Device" table possess only CONFIG version information, rather than possessing information on the use starting date and the use ending date of CONFIG. Therefore, in each of the tables other than the "Device" table, a relative sequence at the time frame of each data is to be obtained from the CONFIG version, and the absolute time information is obtained by joining a device ID and the "Device" table based upon its CONFIG version. This is because by rearranging data along the time frame or comparing a linking key, data on a period which comprises a pair of use starting date and/or use ending date of CONFIG, calculation becomes easier. For example, using the CONFIG version (which is a consecutive number allocated to the period of use of CONFIG) as a liking key.

FIG. 5 shows an example of portions related to interfaces of the entire model.

A [Location] table 502 comprises attributes such as a location ID, a location name, a location class, an address, where to make contact, attribute 1, attribute 2, . . . , attribute x (x is an arbitrary number), and remarks. A "Location class" indicates the classification of locations such as a center, a relay station, and an office. A Location ID is used as a primary key. Attributes 1, 2, . . . , x represent location classification and location information peculiar to the concerned system and are defined according to the concerned system.

A [Device] table 501 comprises such attributes as a device ID, a CONFIG version, an use starting date and an use ending date of CONFIG, a location ID, attribute 1, attribute 2, . . . , attribute x (x is an arbitrary number), new/existing, and remarks. A table primary key includes a device ID and a CONFIG version. A Location ID is a foreign key referring to corresponding attributes in the [Location] table 502. Attributes 1, 2, . . . , x are device specification and setting information pieces peculiar to the concerned system and are defined according to the concerned system.

A [Building Work] table 503 comprises such attributes as a date, a work ID, a device IF, a CONFIG version, operation, and remarks. A set of a date, a work ID, a device ID, a CONFIG version, operation, and remarks is used as a primary key. A set of a device ID and a CONFIG version represents the ID of the concerned device and the use ending date of the setting file, and it is a foreign key for reference to corresponding attributes in the [Device] table 501.

A [Physical Interface] table 504 comprises such attributes as a device ID, a CONFIG version, a port ID, attribute 1, attribute 2, . . . , attribute x (x is an arbitrary number), new/existing, and remarks. A set of a device ID, a CONFIG version, and a port ID is used as a primary key. A set of a device ID and a CONFIG version is a foreign key for making reference to corresponding attributes in the [Device] table 501. Attributes 1, 2, . . . , x represent the physical interface specification and the setting data peculiar to the concerned system and are defined according to the concerned system.

An [ATM, FR Layer Interface] table 505 comprises such attributes as a device ID, a CONFIG version, a port ID, a logical interface ID, an IP address, attribute 1, attribute 2, . . . , attribute x (x is an arbitrary number), new/existing, and remarks. The logical interface ID becomes a VPI/VCI number in an ATM layer interface and a DLCI number in an FR layer interface. Further, it becomes a destination telephone number in case of storage of DDR information. A set of a device ID, a CONFIG version, a port ID, and a logical interface ID is used as a table primary key. A set of a device ID, a CONFIG version, and a port ID is a foreign key for making reference to corresponding attributes in the [Physical Interface] table 504. The IP address is a foreign key for making reference to corresponding attributes in the [IP Layer Interface] table 506. In the router interface, in the case where the same interface is not only an IP layer interface but also an ATM, FR interface, the foreign key is used for correlating the interfaces. Attributes 1, 2, . . . , x represent the ATM, FR layer interface specification and the setting information peculiar to the concerned system and are defined according to the concerned system.

An [IP Layer Interface] table 506 comprises such attributes as a device ID, a CONFIG version, a port ID, a logical interface ID, an IP address, attribute 1, attribute 2, . . . , attribute x (x is an arbitrary number), new/existing, and remarks. The logical interface IF is a sub-interface number. A set of a device ID, a CONFIG version, a port ID, and a logical interface ID is used as a primary key. A set of a device ID, a CONFIG version, and a port ID is a foreign key for making reference to corresponding attributes in the [Physical Interface] table 504. Attributes 1, 2, . . . , x represent the IPR layer interface specification and the setting information peculiar to the concerned system and are defined according to the concerned system.

In FIG. 6, a portion related to the physical interface in the entire model is shown. A portion related to the ATM, FR layer interface and the IP layer interface in the entire model is also shown.

A [Physical Interface] table 601 is constituted by the same attributes as in the [Physical Interface] table 504 shown in FIG. 5.

A [Physical Connection] table 602 comprises such attributes as a device ID, a CONFIG version, a port ID, a connecting device ID, a connecting device CONFIG version, a connecting port ID, a line ID, and remarks. A set of a device ID, a CONFIG version, a port ID, a connecting device ID, a connecting device CONFIG version, and a connecting port ID is used as a primary key. The line ID may be used as a primary key. A set of a device ID, a CONFIG version, and a port ID, and a set of a connecting device ID, a connecting device CONFIG version, and a connecting port ID, are foreign keys for making reference to corresponding attributes in the [Physical Interface] table 601.

An [Internal Transfer] table 603 comprises such attributes as a device ID, a CONFIG version, a port ID, a transferring port ID, and remarks. A set of a device ID, a CONFIG version, a port ID, and a transferring port ID is used as a primary key. A set of device ID, CONFIG version, and port ID, and a set of a device ID, a CONFIG version, and a transferring port ID, are foreign keys for making reference to corresponding attributes in the [Physical Interface] table 601.

Figure 7:
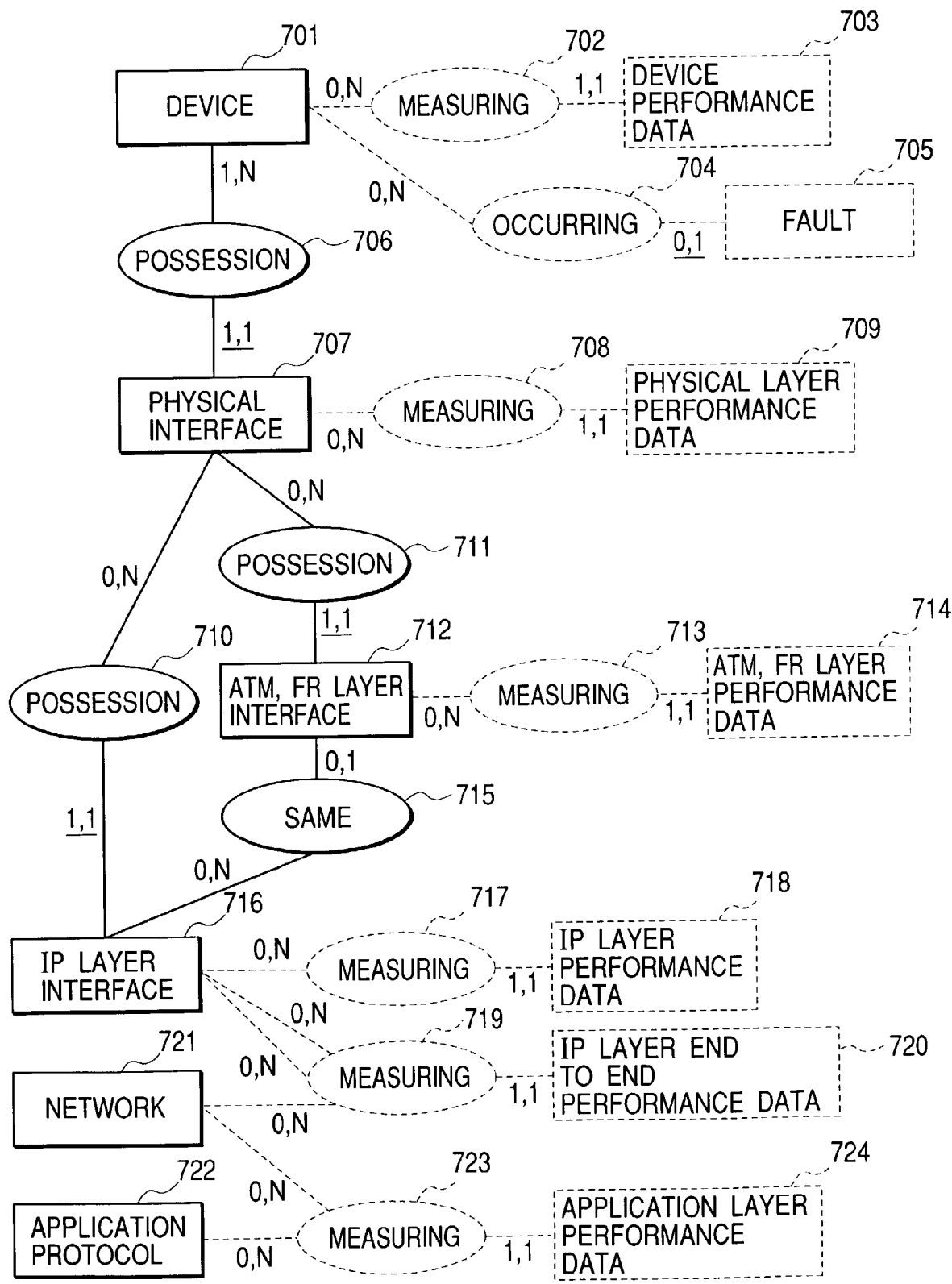
FIG. 7 is an entire information management model entity-related diagram of a network system operation information section according to the present invention.

As explained with FIGS. 3 to 6, the network system setting/configuration data is managed by an information management model and a database table mounting configuration with relation sets using device IDs or interface IDs and CONFIG versions, whereby the following can be effected:

The setting/configuration data management independent of the classification of network devices, including routers, ATM switches, hubs, and servers The history management of the network system setting/configuration data corresponding to a CONFIG version The correlation between network devices and the network system building work information The management of interfaces belonging to the network devices and connecting relations thereof, routing to adjacent devices and communicating devices, and deriving network topology The correlation of an IP layer with an ATM, FR layer FIG. 7 shows an entire information management model concerned with the operation information of a network system described in accordance with the format of the entity-related diagram shown in FIG. 2, which model adapts the following configuration. As to a [device] 701—(possession) 706—a [physical interface] 707—(possession) 710—an [IP layer interface] 716, a [physical interface] 707—(possession) 711—a [TTM, FR layer interface] 712, an [IP layer interface] 716—(same) 715—an [ATM, FR layer interface] 712, a [network] 721, an [application protocol] 722, they are the same as the entities and relations in the information management model shown in FIG. 4.

A [Device performance data] 703 comprises such information pieces as CPU utilization factor and empty memory capacity stored in a management information base (MIB) related to devices, and it is (measured) 702 in one [device] 701. The [Device performance data] 703 defines one entity for each device performance data like a [device information data 1] for CPU utilization factor, a [device performance data 2] for empty memory capacity, etc.

A [Fault] 705 comprises fault information pieces, such as network system plan stop information, device fault information, and SYSLOG, and it (occurs) 704 in 0 or one [device] 701.

A [Physical layer performance data] 709 comprises such information pieces as transmitted/received data volume and the number of packet loss stored in a management information base related to physical interface, and it is (measured) 708 in one [physical interface] 707. The [Physical layer performance data] 709 defines one entity for each physical layer performance data like a [physical layer performance data 1] for transmitted data volume, a [physical layer performance data 2] for received data volume, etc.

An [ATM, FR layer performance data] 714 comprises such information pieces as the number of transmitted and received cells, and the number of cell loss, and it is (measured) 713 in one [ATM, FR layer interface] 712. The [ATM, FR layer performance data] 714 defines one entity for each ATM, FR layer performance data like an [ATM, FR layer performance data 1] for the number of transmitted cell, an [ATM, FR layer performance data 2] for the number of received cell, etc.

An [IP layer performance data] 718 comprises information pieces such as the number of transmitted and received cells, and the number of packet loss for each logical interface stored in a management information base related to IP layer interface, and it is (measured) 7171 in one [IP layer interface] 716. The [IP layer performance data] 718 defines one entity for each IP layer performance data like an [IP layer performance data 1] for transmitted data volume, an [IP layer performance data 2] for received data volume, etc.

An [IP layer End-to-End performance data] 720 comprises such information pieces as End-to-End traffic volume and End-to-End response time stored in a management information base within a probe installed in one [network] 721, and it is (measured) 719 for one set of [IP layer interface] 716. The [IP layer End-to-End performance data] 720 defines one entity for each IP layer End-to-End performance data like an [IP layer End-to-End performance data 1] for End-to-End transmitted data volume, an [IP layer End-to-End performance data 2] for End-to-End received data volume, etc.

An [Application layer performance data] 724 is information of data volume stored application protocol by application protocol in a management information base within a probe installed in one [network] 721, and it is (measured) 723 for one [application protocol] 722. The [Application layer performance data] 724 defines one entity for each application protocol by application layer performance data like an [application protocol by application layer performance data 1] for data volume performance data, an [application layer performance data 1] for the number of packets application layer performance data, etc.

Figure 8:
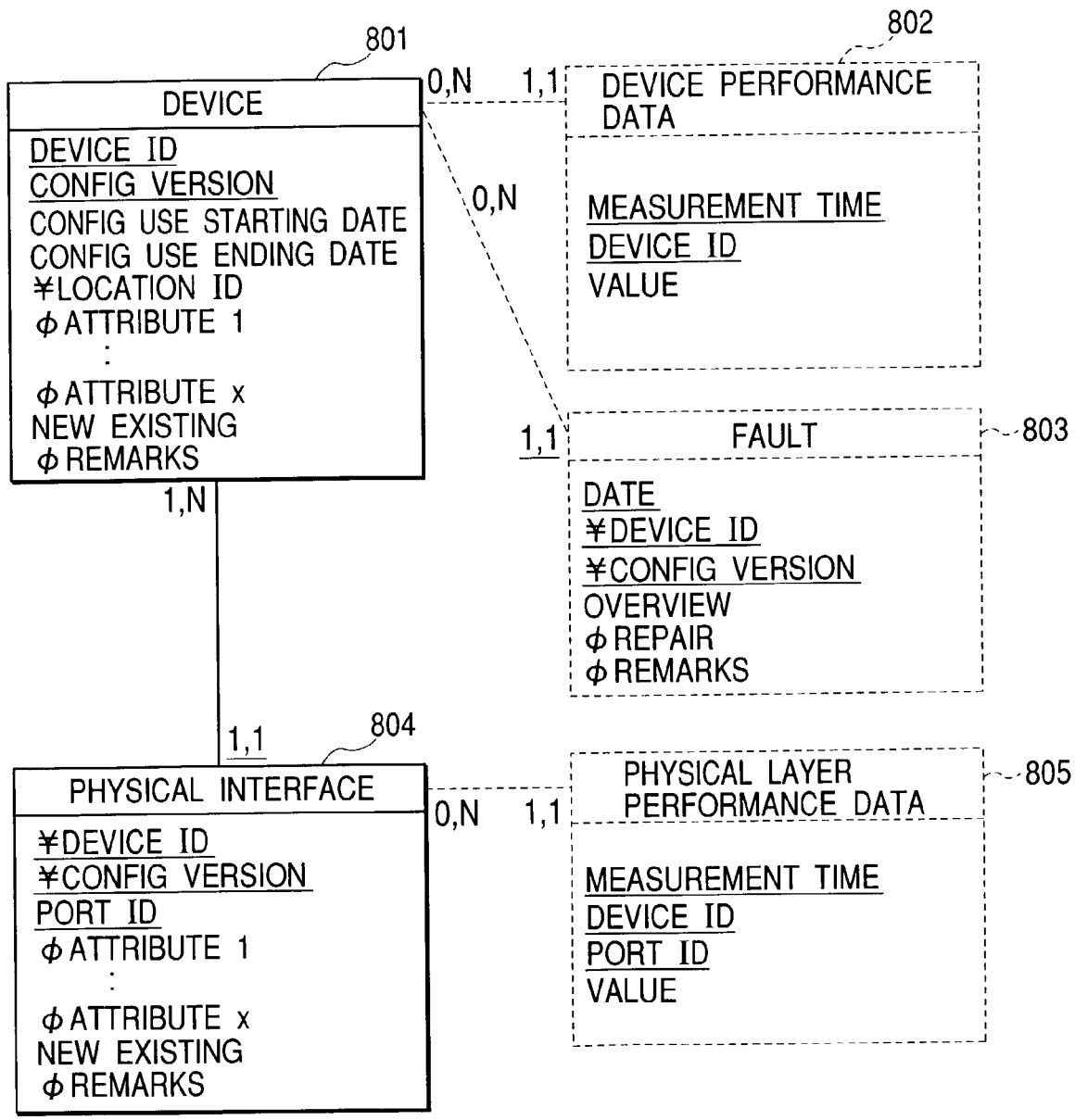
FIG. 8 shows database mounting tables of an operation information-related section according to the present invention.

FIG. 1 shows a portion related to the [device] 701 and the [physical interface] 707 in an entire model concerned with the operation information shown in FIG. 7. Like FIGS. 5 and 6, FIG. 8 is described in accordance with the explanatory notes 507.

A [Device] table 801 and a [Physical Interface] table 804 are of the same configurations as the [Device] table 501 and the [Physical Interface] table 504 in FIG. 5.

A [Device Operation Static Information] table 802 comprises such attributes as a measurement time, a device ID, and a measured value. A set of a measurement time and a device ID is used as a primary key. The {Device Performance data} table 802 builds one table for each set of device performance data like a [device performance data 1] table for CPU utilization factor, a [device performance data 2] for empty memory capacity, etc.

A [Fault] table 803 comprises such attributes as a date, a device ID, a CONFIG version, an overview, repair contents, and remarks. A set of a date, a device ID, and a CONFIG version is used as a table primary key. A set of device ID and CONFIG version comprises ID and CONFIG version of a faulty device, and it is a foreign key for making reference to corresponding attributes in the [Device] table 801.

A [Physical layer performance data] table 805 comprises such attributes as a measurement time, a device ID, a port ID, and a measured value. A set of a measurement time, a device ID, and a port ID is used as a table primary key. The [Physical layer performance data] table 805 mounts one table for each physical layer performance data like a [physical layer performance data 1] table for transmitted data volume, a [physical layer performance data 2] table for received data volume, etc.

Likewise, such entities as the [ATM, FR layer performance data] 714, the [IP layer performance data] 718, the [IP layer End-to-End performance data] 720, and the [Application layer performance data] 724 in FIG. 7 are also mounted in respective corresponding tables.

Thus, as explained using FIGS. 7 and 8, the network system operation information is managed by an information management model and database table mounting configuration with a relation set using a device ID or an interface ID and a CONFIG version, whereby the following can be effected:

Correlation of each set of performance data and fault information with the history of setting/configuration data of network devices and interfaces thereof Correlation between performance data pieces Next, the following description is provided about the flow of a network fault repairing process which utilizes a database having the above information management structure.

If any fault occurs in a network system wherein updating and extension are repeated frequently, the fault is in many cases attributable to a change in setting or configuration made just before the portion concerned. Therefore, for figuring out the factor of a change in the network system performance or any trouble, it is necessary to promptly retrieve a setting-changed portion of the concerned device and check the setting/configuration data.

Figure 13:
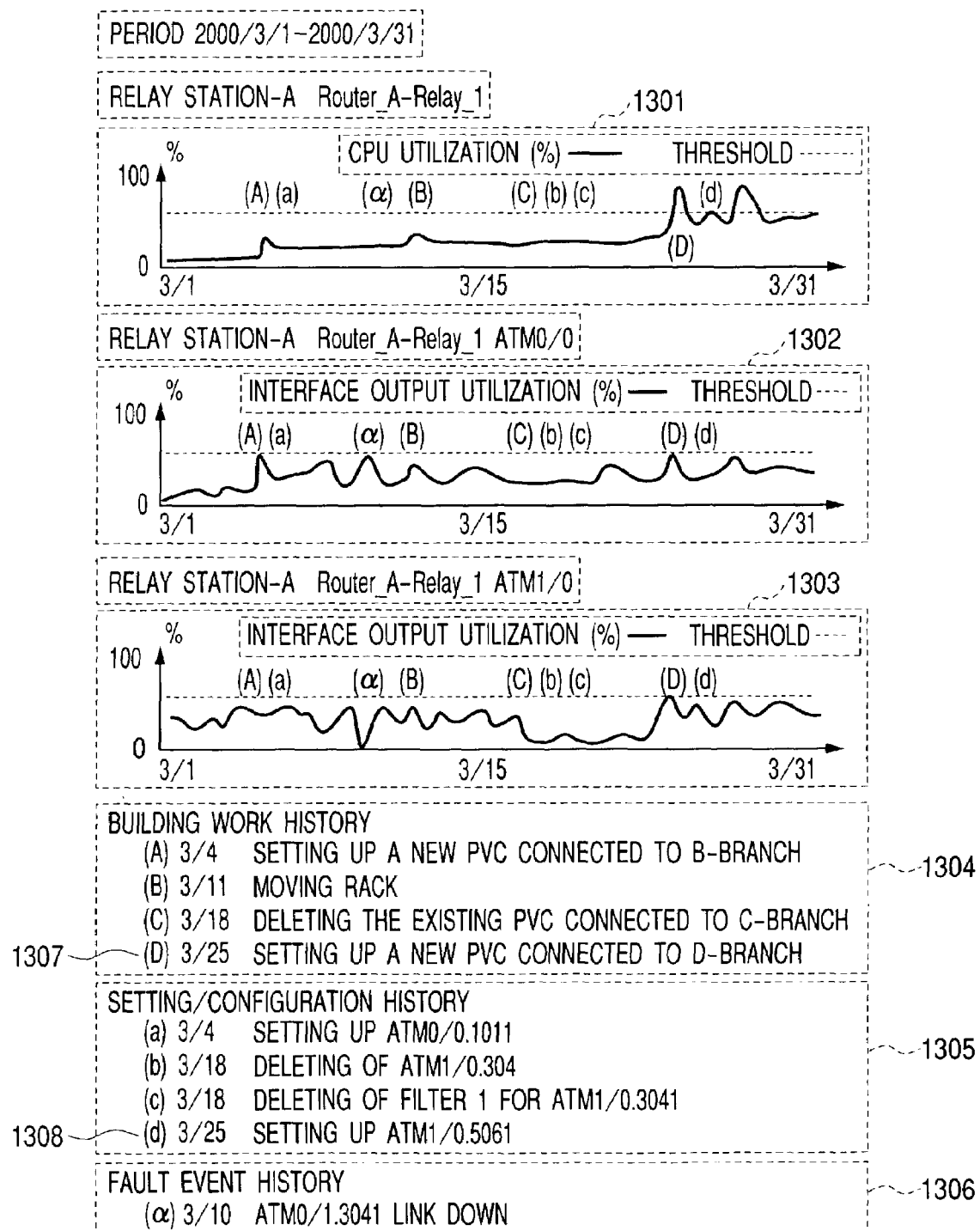
FIG. 13 shows an example of data display in a faulty device according to the present invention.
Figure 14:
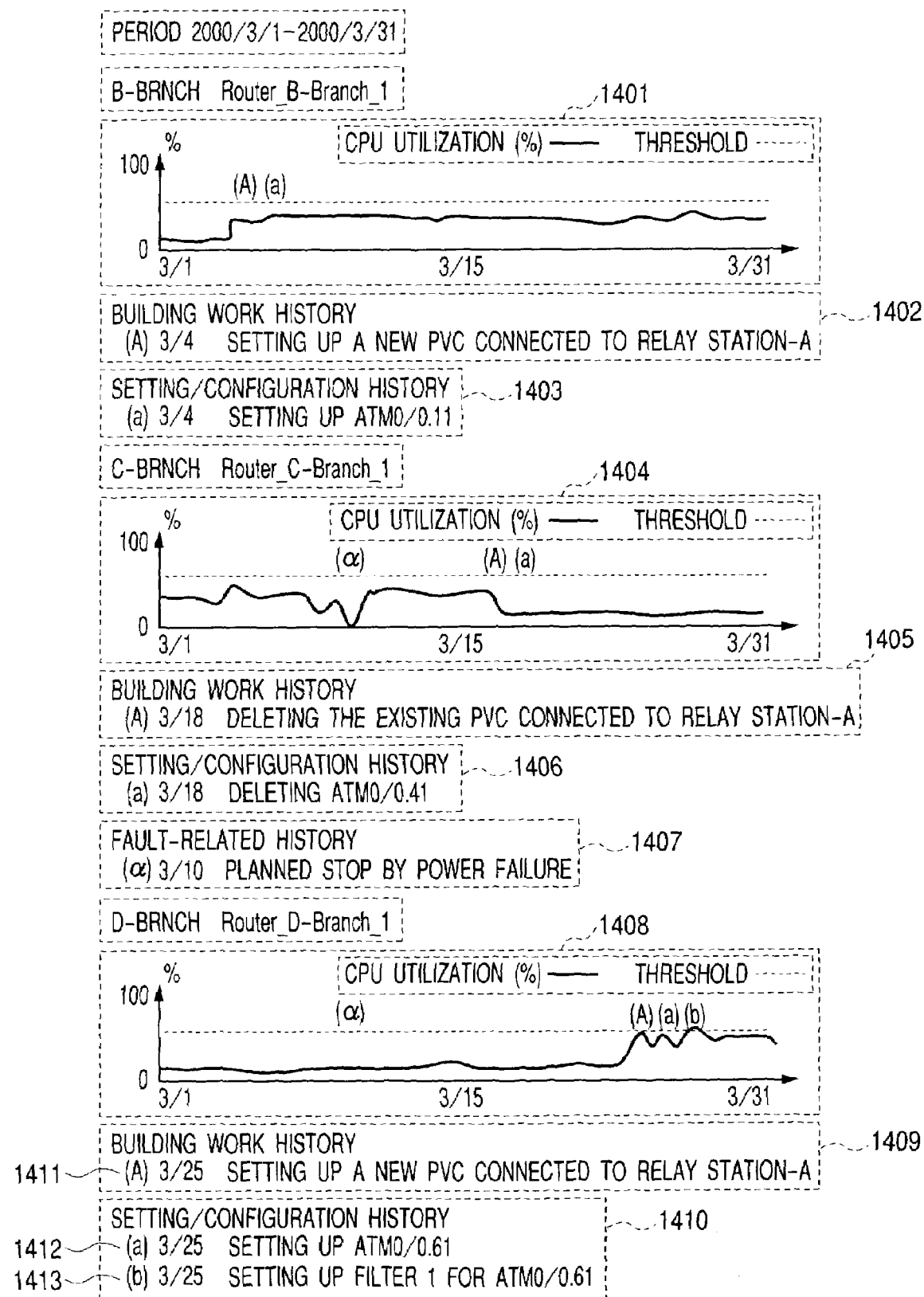
FIG. 14 is a format diagram showing an example of data display in devices adjacent to the faulty device according to the present invention.

In connection with a network system shown in FIG. 9, the flow from the detection of a faulty (symptomatic) or abnormal portion up to figuring out a factor, which is shown in FIG. 10, are described below with reference to FIGS. 11 to 14. FIGS. 11 and 12 show processing examples based on a conventional technique, while FIGS. 13 and 14 show processing examples which utilize the database according to the present invention.

Although in the explanation there is used an enterprise IP network is used as a typical example of a network system, the processings are also applicable to other networks. Further, although reference is made to a router as an example of a network device, the same processings are also applicable to other network devices, including an ATM-SW.

Figure 9:
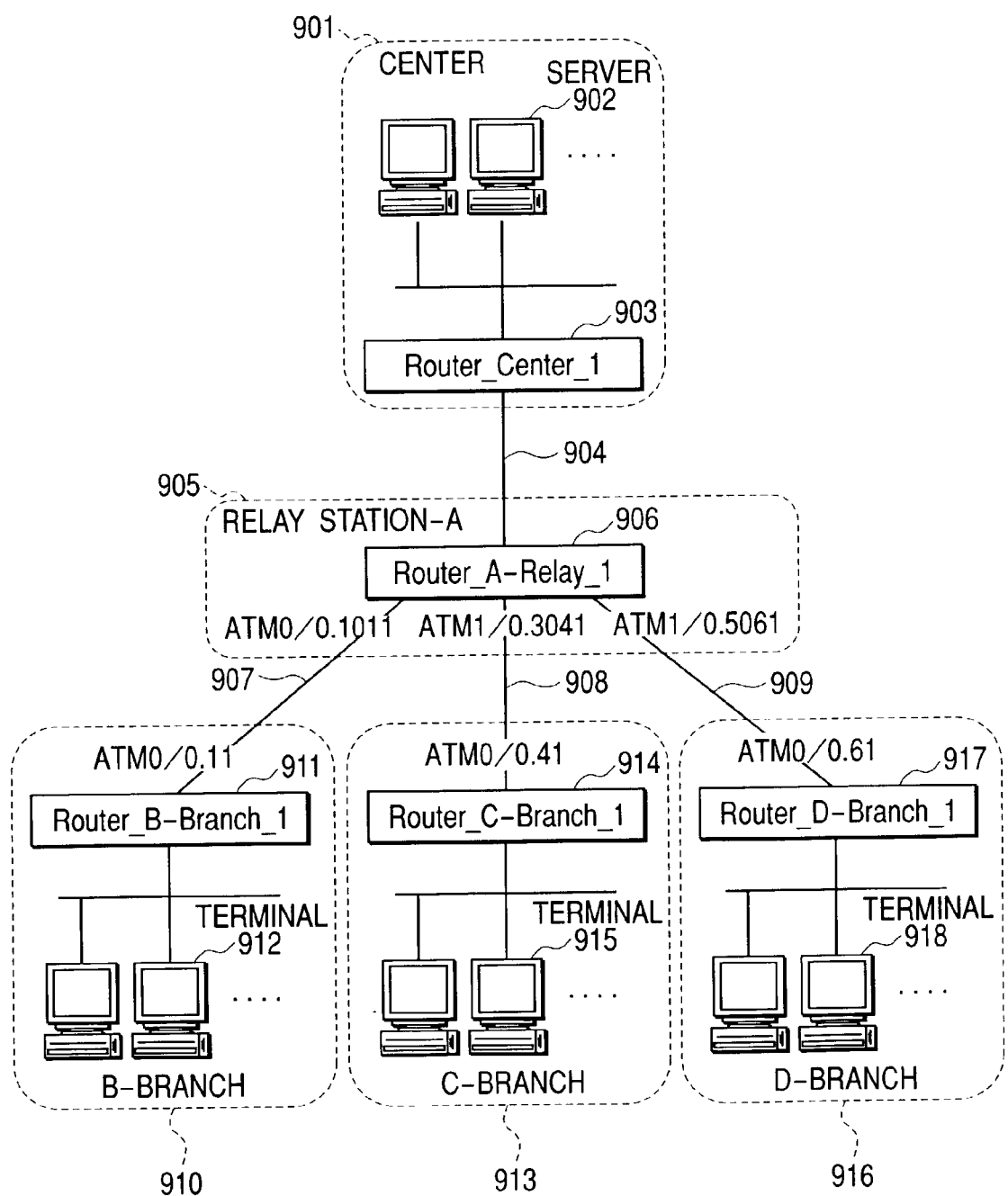
FIG. 9 is a block diagram of a network system according to the present invention.

With reference to FIG. 9, a logical configuration of the network system is described prior to explaining the fault repairing process.

The network system is of a three-layer configuration comprising center 901, relay Station-A 905, B-branch 910, C-branch 913, and D-branch 916. These locations are interconnected through ATM lines 904, 907,908, and 909. Traffic is transmitted and received between servers 902 in a center 901 and terminals 912, 915, 917 in the branches, and the traffic is controlled by a Router_Center_1 903 in the center, a Router_A-Relay_1 906 in relay Station-A, a Router_B-Branch_1 911 in B-branch, a Router_C-Branch_1 914 in C-branch, and a Router_D-Branch_1 917 in D-branch.

The design/configuration data of the network system is registered in the database by the means in FIG. 1. The performance data of each device in the network system is also inputted to the database.

FIG. 10 is a flow chart of the fault repairing process according to the present invention. The fault repairing process in the network system of FIG. 9 is described below along the flow in FIG. 10.

(Step 1): Fault (Symptom) Detection 1001

In the network system, when a value exceeding a threshold is detected in each of performance data pieces, such as device performance data, physical layer performance data, ATM, FR layer performance data, IP layer performance data, IP layer End-to-End performance data, and application layer performance data, which are collected periodically form the devices or the probes by the performance data collecting means, or if there is detected any trouble, such as interface down of a device in a network device monitoring system, it is regarded that a fault or a fault symptom has occurred.

In the example shown in FIG. 13, values exceeding the threshold are detected twice at the end of March 2000 in a CPU utilization factor 1301 which is device performance data in a Router_A-Relay_1 (906 in FIG. 9) at relay Station-A.

(Step 2): Search 1002 of the Concerned Device

With respect to a device which indicates a fault (symptom), such as an abnormal performance, performance data indicative of an abnormal performance and other performance data in the same device are retrieved and displayed graphically for checking an operating condition. Further, for figuring out a factor of the abnormal performance, the history of the building work, the setting/configuration data and the fault event information associated with the concerned device is retrieved by tracing a database link and is displayed in association with each set of performance data. A change in each set of performance data in the concerned device and the corresponding building work information, a location of change in device setting or configuration, and fault event information, such as power failure and SYSLOG, are searched from the displayed information to check whether there has been any such a change in the setting or configuration as causes of a change in performance of the device.

Conventional work examples are shown in FIGS. 11 and 12.

FIG. 11 shows an example of a building work file (work directions).

FIG. 12 shows an example of extracting a building work history from the building work file. In this example, a case of extracting building history information from the building work file is considered. Heretofore, the information related to the building work has been described in the form of work directions 1101, which is in many cases prepared for each work location concerned. Each work direction describes a date 1102, a location name 1103, and operation 1104. The operation 1104 describes plural devices for works, as well as works to be done by the devices. Therefore, if a building work history is extracted from plural files of such a type, a location-by-location history results are shown as in FIG. 12. Performance data is measured per each device or each device interface, so even if a value exceeding the threshold is detected in a device or an interface, or even if a trouble such as device interface down is detected, it is impossible to make a direct linkage with the building work history Work examples according to the present invention are described below with reference to FIGS. 13 and 14.

FIG. 13 shows an example of data display in a device (faulty device) in which a fault has occurred. A case of using a database having a relation based on a device ID or an interface ID and a CONFIG version, which has been described earlier, is now explained with reference to FIG. 13. In the Router_A-Relay_1 at relay Station-A, the CPU utilization factors during the period from Mar. 1 to Mar. 31, 2000 which indicate an abnormal performance are retrieved and displayed graphically for checking the operating condition. Further, physical interphases "ATM0/0" and "ATM1/0" which the Router_A-Relay_1 possesses are retrieved to check interface output utilization as the physical layer performance data measured for them, and graphs 1302 and 1303 in the same period are displayed.

For figuring out a factor of a performance trouble, the history of the building work executed for the Router_A-Relay_1 is retrieved and displayed in 1304. Moreover, the history of interface information pieces which the Router_A-Relay_1 possesses and their attribute information pieces are displayed as a setting/configuration data history 1305. Further, the history of the fault event information the in Router_A-Relay_1 is retrieved and displayed in 1306. In 1304, 1305, and 1306 of the building work history, the setting/configuration history, and the fault event history, respectively, a measure is taken. For example, marks are given, to make it clear how they are correlated with the time frames in the graphs 1301, 1302, 1303 of the respective performance data pieces. These history information pieces each possesses a device ID or an interface ID and a CONFIG version as data. Therefore, it is possible to effect a direct retrieval if the name of device "Router_A-Relay_1" and the name of interface "ATM0/0, " "ATM1/0" are specified.

From the graphical displays, it appears that the interface output utilization 1303 of the "ATM1/0" corresponds to the beyond the threshold variation at the end of March in the CPU utilization factor 1301 of the Router_A-RElay_1. It also appears that at that period there were conducted a building work "PVC preparation for new business for D-branch" 1307 (building work history 1304 (D)), and a setting/configuration change "ATM1/0.5061 new setting" 1308 (setting/change history 1305(*d*)).

(Step 3): Search for Adjacent Devices and Communicating Devices

When a device exhibits a fault (symptom), the cause may be attributed to an adjacent device or a communicating device on the network topology of the concerned device rather than the concerned device itself. Therefore, information on devices adjacent to the device which exhibits a fault (symptom) and on communicating devices are obtained by retrieving connecting information between interfaces in database and then their performance data pieces are retrieved and displayed graphically. For figuring out a factor of the fault (symptom), the history of information on adjacent devices to the concerned device and relating building works, the setting/configuration data, and the fault event information are retrieved and is displayed in a correlated state with the associated performance data pieces. From the displayed information, a search is made for changes of the performance data pieces in the devices and corresponding locations of changes in building work information and the setting/configuration data, as well as the fault event information pieces, such as power failure and SYSLOG, to check whether there has been any such changes in setting or configuration as causes of a change in performance of the devices.

FIG. 14 shows an example of data display in devices adjacent to a faulty device. As shown in the same figure, the Router_B-Branch_1 (911 in FIG. 9) in B-branch, the Router_C-Branch_1 (914 in FIG. 9) in C-branch, and the Router_D-Branch_1 (917 in FIG. 9) in D-branch, which are adjacent networkwise in the IP layer to the Router_A-Relay_1 (906 in FIG. 9) at the relay Station-A, are retrieved based upon the information registered in the IP layer connection table of the database. Then, in the same way as in the graphic display of the performance data of the Router_A-Relay_1 in FIG. 13, CPU utilization factors in the same period are retrieved and displayed graphically at 1401, 1404, 1408.

For estimating a factor of a performance trouble, building work histories 1402, 1405, and 1409 which were executed respectively for the Router_B-Branch_1, the Router_C-Branch_1, and the Router_D-Branch_1 are retrieved and displayed. Also, interface information pieces which the routers possess, as well as their attribute information pieces, are retrieved and displayed as setting/configuration data histories 1403, 1406, 1410. Further, the history 1407 of the fault event information in each router is retrieved and displayed. As to the displays 1402, 1403, 1405, 1406, 1407, 1409, and 1410 of the building work history, the setting/configuration history, and the fault event history, a measure is taken. For example, marks are given to clarify how they are correlated with the time frames of the performance data graphs 1401, 1404, and 1408.

From the graph displays, it appears that the CPU utilization factor 1408 of the Router_D-Branch_1 corresponds to the beyond the threshold variation at the end of March in the CPU utilization factor 1301 of the Router_A-Relay_1 in FIG. 13. It also appears that during the period concerned there are performed a building work "PVC preparation for new business for Yokohama relay Station" 1411 (building work history 1409(A)), a setting/configuration change ("ATM0/0.61 new setting" 1412 (setting/change history 1410(*a*)), and "ATM0/0.61 filter 1 new setting" 1413 (setting/change history 1410(*b*)).

From the above, it can be estimated that, in the examples shown in FIGS. 13 and 14, configuration changes "ATM0/0.61 new setting" 1412 and "ATM0/0.61 filter 1 new setting" 1413 in "Router_D-Branch_1" in D-branch are related to the beyond the threshold variation at the end of March in the CPU utilization factor 1301 of the Router_A-Relay_1 at the relay Station-A.

(Step 4): Search 1004 for Past Fault Repair Contents

From the history of the fault event information, a search is made for repair contents so far taken upon any occurrence of like faults (symptoms) to be applied in coping with the present fault (symptom) repairing. More specifically, with "overview" as a key, a similar overview is retrieved from the "Fault" table 803 in the database shown in FIG. 8, and the contents of the repair taken against that overview are displayed. In the "fault" table 803 of FIG. 8, a title or heading of a fault is recorded in the "overview". And it is recorded in the "repair" how to repair the faults of the linked device 801. When a fault occurred at a device, an operator retrieves similar fault data of same-type devices from the "fault" table by searching the "overview" s. If a similar fault is found, the operator tries to repair the device's fault by referring to the retrieved "repair".

(Step 5): Repair 105

Repairing is made against a device fault (symptom). The following are examples of a repair:

Reset of the device and ports

Restoring the contents of setting and configuration to the contents of the immediately preceding CONFIG version Device replacement Continuation of the search. When the fault occurred instantaneously (i.e., not continuously, not intermittently, and not periodically) and the device seems to return to the normal state after that, the operator keeps watch on the device and monitoring the device state. (The operator will stop watching after confirming that the device works normally enough.)

(Step 6): Reporting 1006

The execution from (Step 1) to (Step 5) is reported to the network system user.

Like the flow of the network fault repair process shown above in (Step 1) to (Step 6), the building work information, the setting/configuration change information, and the fault event information of the network system corresponding to changes in the operating condition of the network system can be checked directly by utilizing the database so as to figure out a factor of a fault, such as a change or a trouble in performance of the network system and to make a repair in a relatively easy manner.

Although in the processing example shown in FIG. 10, the building work information, the setting/configuration data, and the fault event information of a device are retrieved based upon the device's performance data, but conversely the device's performance data can be retrieved based upon the building work information, the setting/configuration data, and the fault event information of the device. For example, after the end of a building work, in order to ensure that the concerned device is not degraded in comparison with its state before the work, a work of displaying performance data for the confirmation is performed. Also in this case, by retrieving the database using the work device ID or the interface ID and the work time as a retrieval key, the performance data of the concerned device can be displayed easily so as to figure out the states before and after the work. With the conventional file management, the implementation of such a processing has been difficult, but can be implemented if the history of the network system setting/configuration data and the performance data are managed by the database having a relation based on a device ID or an interface ID and a CONFIG version.

Since the present invention is provided with the configuration described above, it is possible to manage the history of the setting information and configuration data of devices in a network system and to display the history of the setting/configuration data on the concerned device along with the adjacent devices or the communicating devices simultaneously with the performance data of one device on a network or plural devices located along a communication path.

Further, it is possible to manage the history of the building work information of a network system and to display the history of the building work information related to the concerned device and adjacent devices or communicating device simultaneously with performance data of one device on a network or plural devices located along a communication path.

Moreover, it is possible to manage the history of fault event information in a network and to display the history of the fault event information of the concerned device and adjacent devices or communicating devices simultaneously with performance data of one device on a network or plural devices located along a communication path.

Further, it is possible to manage the history of fault repair contents in a network system and to display fault repair contents corresponding to the fault event information of the concerned device and adjacent devices or communicating devices displayed simultaneously with performance data of one device on a network system or plural devices located along a communication path.

Accordingly, it is possible to check the setting/configuration data history, the building work information history, and the fault event information of a network device corresponding to a change in performance data so as to figure out a fault factor upon occurrence of a change in operating condition of the network system.

Further, with reference to past fault repair contents, it is possible to plan a measure against a change in operating conditions.

The principles, preferred embodiments and modes of operation of the present invention have been described in the foregoing specification. However, the invention which is intended to be protected is not limited to the particular embodiments disclosed. The embodiments described herein are illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A supporting method for network troubleshooting, comprising:
    storing setting/configuration data which includes physical location information and building work information, and performance data of devices constituting the network based upon a schema of device IDs, interface IDs, and a respective CONFIG version number thereby correlating said setting/configuration data with said performance data;
    monitoring the performance data of the devices by comparing the performance data with respective threshold values;
    when the performance data of at least one device goes beyond a respective threshold value ("faulty device"), identifying the faulty device based upon the schema; and
    storing the identified result for network troubleshooting.

2. The supporting method for network troubleshooting according to claim 1, further comprising displaying the identified result.

3. The supporting method for network troubleshooting according to claim 1, wherein the identifying step involves identifying plural devices located along a communication path with said at least one of the devices and retrieving historical setting/configuration data and performance data of the plural devices based upon the schema.

4. The supporting method for network troubleshooting according to claim 1, further comprising:
    repairing the faulty device by one of:
    resetting faulty device;
    retrieving historical setting/configuration data of the faulty device based upon the schema thereby restoring the historical setting/configuration data of the faulty device;
    replacing the faulty device.

5. The supporting method for network troubleshooting according to claim 4, further comprising:
    storing the repairing result.

6. The supporting method for network troubleshooting according to claim 4, further comprising:
    retrieving past fault repair contents based upon the schema; and
    selecting one of the repairing step based upon the past fault repair contents.

7. The supporting method for network troubleshooting according to claim 1, wherein the device IDs include router IDs, ATM switch IDs, and layer three switch IDs, switching hub IDs, and the interface IDs include physical interface IDs, logical interface IDs, and sub-logical IDs.

8. The supporting method for network troubleshooting according to claim 1, wherein performance data of devices includes device performance data, physical interface performance data, logical interface performance data, sub-logical performance data, sub-logical End-to-End performance data, and application layer performance data.

9. A system for supporting network troubleshooting, comprising:
storage means for periodically storing setting/configuration data which includes
physical location information and building work information, and performance data of devices constituting the network based upon a schema of device IDs, interface IDs, and a respective CONFIG version number thereby correlating said setting/configuration data with said performance data;
monitoring means for monitoring the performance data of the devices by comparing the performance data with respective threshold values;
identifying means for identifying the faulty device based upon the schema, when the performance data of at least one device goes beyond a respective threshold value ("faulty device"), wherein
the storage means further stores the identified result for network troubleshooting.

10. The system according to claim 9, further comprising display for displaying output of the identifying means.

11. The system according to claim 9, wherein the identifying and retrieving means also identifies plural devices located along a communication path with said at least one of the devices and retrieving historical setting/configuration data and performance data of the plural devices based upon the schema.

12. The system according to claim 9, further comprising:
repairing means for repairing the faulty device by one of:
resetting faulty device;
retrieving historical setting/configuration data of the faulty device based upon the schema thereby restoring the historical setting/configuration data of the faulty device on the faulty device;
replacing the faulty device.

13. The system according to claim 12, wherein the storage means further stores output of the repairing means.

14. The system according to claim 12, further comprising selecting means for selecting one of the repairing step based upon past fault repair contents retrieved by the retrieved means.

15. The system according to claim 9, wherein the device IDs include router IDs, ATM switch IDs, and layer switch IDs, switching hub IDs, and the interface IDs include physical interface IDs, logical interface IDs, and sub-logical IDs.

16. The system according to claim 9, wherein performance data of devices includes device performance data, physical interface performance data, logical interface performance data, sub-logical performance data, sub-logical End-to-End performance data, and application layer performance data.

17. An operation data managing method for a network system, comprising:
establishing a data management schema of the network system based upon components of the network, relation between the components, and operation data associated with the components;
periodically storing the operation information based upon the schema and a respective CONFIG version number; and
selectively extracting at least one of the components and associated operation data using the CONFIG version as a linking key, wherein
the operation data include setting/configuration data which includes physical location information and building work information, and performance data of the components thereby correlating said setting/configuration data with said performance data.

18. The operation data managing method according to claim 17, wherein the components of the network, the operation data associated with the components, and the CONFIG version number are recorded in a table format.

19. The operation data managing method according to claim 18, further comprising selectively extracting at least one of the components and associated operation data using said at least one of the components as a linking key.

20. The operation data managing method according to claim 18, further comprising selectively extracting based upon the schema plural components located along a communication path with one component of interest as well as operation data of the plural components.

* * * * *